Figures 1, 2:
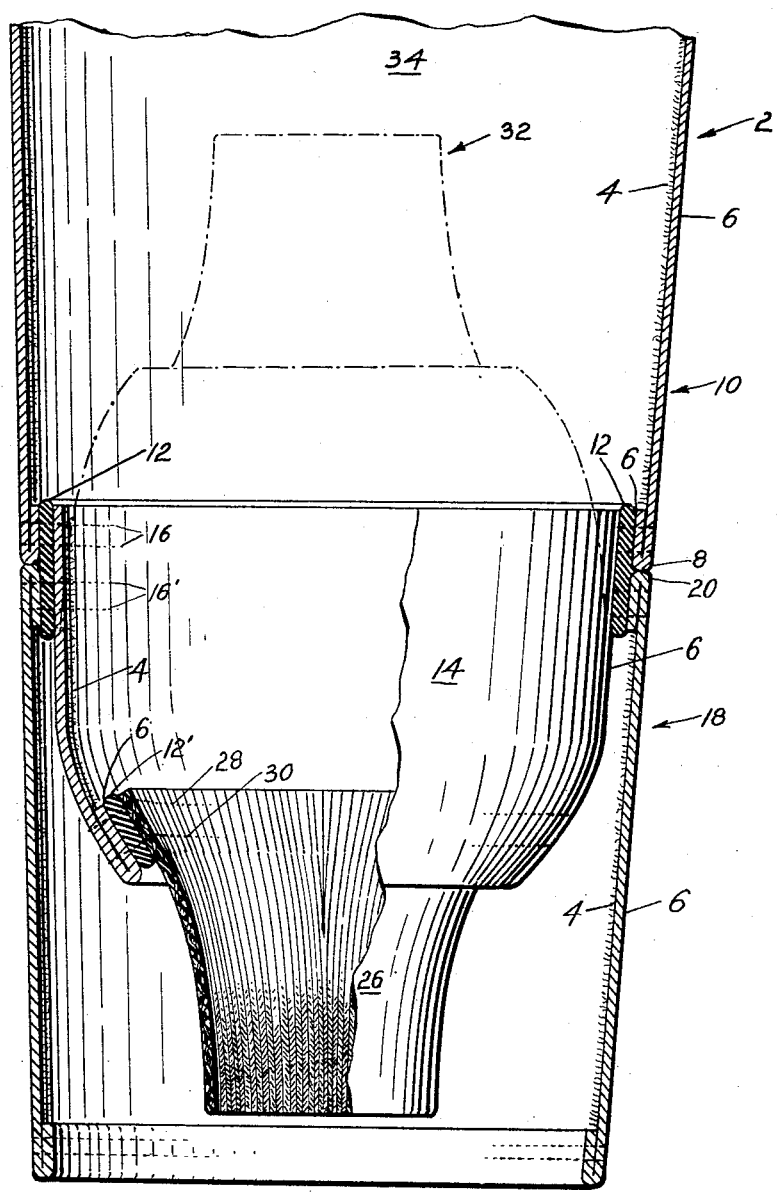

Dec. 9, 1930.  W. H. HEATON  1,784,285
METHOD AND MEANS FOR MAKING GARMENTS
Filed Oct. 26, 1926

INVENTOR.
William H. Heaton
BY M. C. Frank
ATTORNEY

Patented Dec. 9, 1930

1,784,285

UNITED STATES PATENT OFFICE

WILLIAM H. HEATON, OF OAKLAND, CALIFORNIA, ASSIGNOR TO TUFOAK PRODUCTS CO., OF OAKLAND, CALIFORNIA

METHOD AND MEANS FOR MAKING GARMENTS

Application filed October 26, 1926. Serial No. 144,332.

My invention relates to the making of garments such as raincoats from rubberized materials and especially, though not solely, to a manner of making garments from the material described in my copending application Serial No. 144,331, filed October 26, 1926, entitled, A rubbery material and method of making same.

In the past it has been the practice in making garments such as rubber raincoats and the like, to manufacture the rubber or rubberized fabric therefor in two distinct steps separated by the tailoring of the garment. In the first step the rubber or rubberized fabric was completely formed but was left in its tacky uncured condition. In this condition the material was cut, set, and formed into garments, which had then to be supported on forms within a vulcanizing oven and cured in the second step. This separation of the process of cloth manufacture made it practically necessary to produce cloth in small quantities and to tailor the garments at the same place and time with the manufacture of the cloth. Moreover, the tacky rubber substance was difficult to work with in tailoring. Where the improved fleecy-faced rubber material, described in my said copending application, was made in this manner and formed into garments before vulcanizing, the rubber face of the finished garment was invariably covered with fuzz collected from the fleecy face of adjacent material. At times, when the materials were allowed to lie in contact with one another for long, they became so firmly cemented together that the fleecy material was entirely stripped in separating them, leaving a bare face.

It is an object of my invention to overcome the disadvantages of the prior methods of manufacturing rubberized garments, by devising a new and improved method. It is further an object of my invention to teach a means well-adapted to the production of the desired results with said method.

It is an object of my invention to teach a method of making rubberized garments which permits the vulcanizing step to be accomplished in a minimum of space and time and by air curing solely.

It is a further object of my invention to devise a method of manufacturing garments having a rubber surface and a fleecy lining.

It is a further object of my invention to teach a method and means for making garments absolutely waterproof.

It is a further object of my invention to provide an improved sleeve which is both waterproof and is sealed against entrance of water through its open end and absolutely waterproof at the wrist.

Other and ancillary objects of my invention will be presented in the following specification and will be suggested by the particular uses of its disclosure. Certain of its objects may be realized with the use of less than all its refinements, or with modifications within its purview. I desire therefore not to be circumscribed beyond the limits of the claims constituting the final determination of my invention.

Referring to the drawing:

Figure 1 is a longitudinal mid-section of the end portion of an improved waterproof garment sleeve, illustrating certain refinements in method and means of my invention. Fig. 2 is a magnified edge view of the rubber cloth in section.

A sheet of canton flannel 2 having a fleecy face 4 is coated on its sinewy back portion 3 with a layer of rubber 6. The material in this condition, instead of being cut and formed into garments, is rolled into large bolts that are placed in a vulcanizing chamber to be cured. Special precautions must be taken in this step of manufacture; and these are outlined in my said copending application. It is especially to be noted that means are provided to prevent contact between, and to permit heat to permeate into, the layers of the roller bolt. As compared to the old method of supporting each completed garment separately and in spaced relation within the vulcanizing chamber, my method permits a marked saving in space and therefore in cost.

After removal of the processing auxiliaries, the material is in finished condition ready for sale like any other dry-goods cloth and requires no further treating after being made into garments. A central plant may produce this material economically in large quantities and distribute it to specialists in the manufacture of raincoats, of gloves, or of other products. The material is then tailored or fashioned, into garments as the last step in manufacture.

A certain advantage of the past art, not realized by the steps of my method so far disclosed, resides in the fact that garments formed of uncured rubber tend to seal themselves against leakage at the seams when cured. The seal is effective enough as a rule, for ordinary purposes; but the rubber surface must be finished to a hard wear-resisting surface, and so cannot be made of material sufficiently tacky to absolutely insure a waterproof surface adhesion in the seams. I have attained an absolutely leakproof seam, illustrated in Fig. 1, by folding the edge 8 of a portion 10 of a garment so that its rubber surface 6 is at the outside of the fold. A layer 12, of air-curing tacky rubber gum is applied to the fold. The portion of rubberized cloth 14, to be joined, is then placed with its rubber face against the layer 12, and the three elements are sewed together by a stitching 16 which passes through, and in time becomes vulcanized into, the air-curing gum 12. The section 18, of material, is joined to the sleeve portion 10 by folding its edge 20 similar to the edge 8, and sewing the two folded edges together with a portion of the tacky gum interposed therebetween. The stitching 16' passes through the layers of each piece of material. The gum 12 has no structural function to perform and can be made gummy enough to form an effective waterproof seal. It is important that an air-curing gum be used so that no vulcanizing heat need be applied to the finished garment.

My method and means will be made clearer by a concrete explanation of its illustrated application. The sleeve illustrated in the drawing is adapted for firemen's or fishermen's coats wherein a high degree of waterproofing is required. The portion 14 of rubberized cloth is an inner sleeve attached in telescoping relation within the sleeve 10. Its rubber surface 6 prevents leakage through the inner sleeve, the layer of rubber gum 12 prevents leakage between the two sleeves, and a wide annular waterproof fabric reinforced rubber band 26 at the wrist end of the inner sleeve hugs the wrist of the wearer and prevents leakage between the inner sleeve and the arm of the wearer. I prefer to use a fabric reinforced rubber-surfaced material such as that disclosed in patent No. 1,220,372 issued March 27, 1917, to A. C. Squires. The band 26 is secured to the end of the inner sleeve by a stitching 28 and 30, and a layer 12' of air-curing tacky gum is interposed to insure a watertight seal. It will be understood that the thickness of fabric and seams has been greatly exaggerated for clarity of illustration. The inside of the inner sleeve presents a nominally smooth surface so that the hand or closed fist may be thrust through the sleeve opening. In withdrawing the hand from the sleeve, the inner sleeve reverses itself to the dotted line position 32 shown in the drawing, so that the hand may be pulled straight out without carefully holding the sleeve and expanding it. The inner sleeve will resume its normal position without further attention when the hand is next thrust through the sleeve.

Certain features of this inner sleeve are old, but I have generally improved upon the prior art, making use of the improved materials and methods of my invention, to produce an absolutely leakproof sleeve at the wrist as well as at the seams. A common test of its effectiveness in a coat is secured when the wearer's forearm is held vertically beneath a water drip or in general firemen's use. The sleeve end between the sections 14 and 18 fills with water but the inside portion of the sleeve at 34 remains perfectly dry.

I claim:

1. In a waterproof garment formed of rubber-coated cloth, a sleeve-like limb-encasing member comprising an upper tubular portion, a lower tubular portion abutting said upper portion as a continuation thereof, and a second lower portion disposed within said first lower portion and providing a small end adapted to hug the limb of the wearer, all of said portions having only the outer surfaces thereof rubber-coated and the larger end of said lower portion being secured to both of said other portions at their point of abutment for securing the three portions together, the seam edges of said outer portions being folded inwardly to dispose rubber surfaces thereof in opposition to that of the inner portion.

2. In a waterproof garment formed of rubber-coated cloth, a sleeve-like limb-encasing member comprising an upper tubular portion, a lower tubular portion abutting said upper portion as a continuation thereof, and a second lower portion disposed within said first lower portion and providing a small end adapted to hug the limb of the wearer, all of said portions having only the outer surfaces thereof rubber-coated and the larger end of said inner lower portion being stitched to both of said outer portions at their point of abutment for securing the three portions together, the seam edges of said outer portions being folded inwardly to dispose the rubber surfaces thereof in opposition to that of the inner portion and a layer of air curing raw rubber engaged between the outer portions and inner portion at the stitching for sealing the joint thereat.

3. The method of making a waterproof seam at the juncture of two pieces of fabric having a waterproof surface, which comprises folding back the seam edge of one of the pieces with its waterproof surface on the outside of the fold, disposing said seam edge to have its waterproof surface in opposition to the waterproof surface of the seam edge of the other piece, applying a preformed sheet of air-curing waterproofing material between and in contact with the opposed waterproofed surfaces of said edges, and stitching said edges together through said sheet to complete the seam.

4. A method of making waterproof seams between pieces of rubber-faced fabric-backed cloth, which comprises folding back the seam edge of one piece with its rubber face on the outside of the fold, disposing said edge to have its rubber face in opposition to the rubber-faced seam edge of the other piece, interposing a preformed and relatively thick layer of an air-curing rubber composition between and in contact with the rubber-faced surfaces of two edges of the cloth to be joined, and sewing said edges to each other with the stitching passing completely through said sheet and the opposed cloth portions.

In testimony whereof, I affix my signature.

WILLIAM H. HEATON.